Patented Oct. 23, 1945

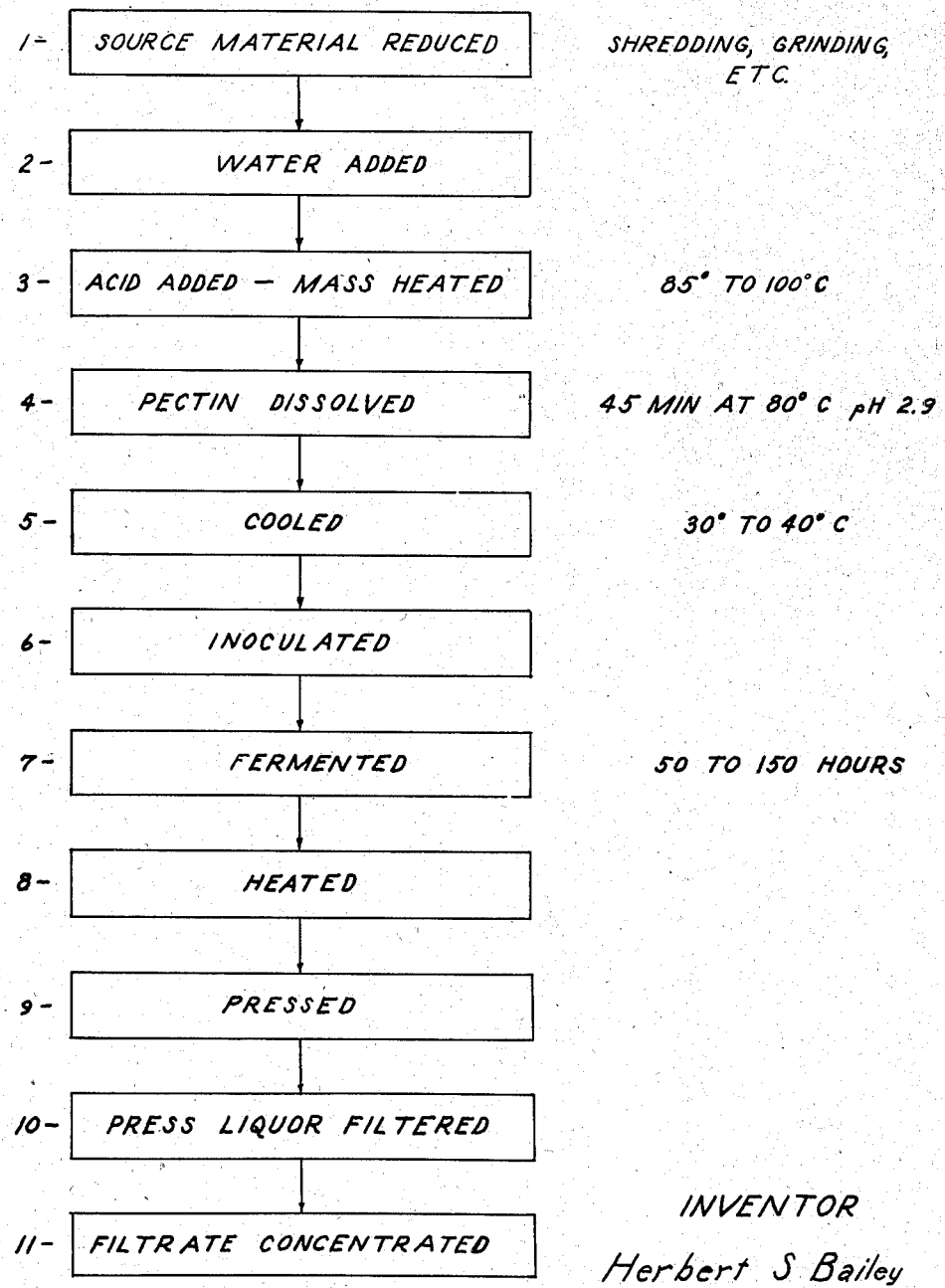

2,387,636

UNITED STATES PATENT OFFICE 2,387,636

METHOD FOR THE PREPARATION OF PECTIN

Herbert S. Bailey, Ontario, Calif., assignor to California Fruit Growers Exchange, Los Angeles, Calif., a corporation of California Application February 21, 1945, Serial No. 579,140

6 Claims. (Cl. 195—2)

My invention relates to a process for extraction of pectin from pectinous vegetable materials, and particularly deals with a process for reducing the viscosity of pectin solutions which are obtained from such vegetable materials.

An object of my invention is to provide a method for reducing the carbohydrate and other soluble solids content of solutions obtained in processes for extracting pectin from pectinous vegetable materials.

Another object is to provide a method for alcoholic or other fermentation of the vegetable material to reduce the viscosity of the resultant pectin solution in order to provide for easier handling of said solution.

A further object is to provide a new and improved process for extracting pectin from pectin-containing materials.

The drawing represents generally a flow sheet of the steps in a preferred embodiment of my new process.

Common processes for preparing a dried pectin or a pectin concentrate involve extraction of the soluble pectin from a vegetable material in which it occurs. This is generally accomplished by, as a first step, an aqueous treatment at somewhat elevated temperatures. Since the vegetable material ordinarily contains pectin largely as insoluble protopectin, the water usually contains an acid, for example sulfurous, whose function is to hydrolize the protopectin and thus render it soluble in water. There are many different specific embodiments of this process, varying as to the acid employed, time and temperature of the aqueous treatment, amount of water used, and in other details, but all of the most used processes answer to the above general description. Apple pomace and citrus fruit peel are the most common sources of pectin in commercial production, though others, such as sugar beets, may also be similarly treated.

After obtaining in solution the pectin of the source material, or at least a major portion of the same, in order to proceed with preparation of a commercial product, it is obviously necessary to separate the solution from the large volume of insoluble vegetable residue. This may be accomplished by pressing the material in a hydraulic press to squeeze out the pectin solution, and filtering the solution to remove finely divided solids not retained in the press cake. Here also commercial practice may vary, but an equivalent step is always necessary.

After clarification of the pectin liquor, the pectin may, for the production of a dried product, be precipitated from solution, for example, by the use of alcohol, or in accordance with any of the several well known methods.

I have discovered a treatment involving a fermentation step to be interposed between the first treatment for obtaining the pectin in solution and the separation of the pectin solution from the residue. This treatment results in numerous advantages which will in part be enumerated herein and will in other part be obvious to those conversant with this art.

Generically, my process involves the alcoholic or other fermentation of the vegetable material after processing it to get the pectin dissolved in water, but before it is attempted to separate the spent vegetable residue from the pectin solution.

The following specific examples will disclose certain manners in which I have practiced my invention, but are not to be regarded as showing specifically all the ways in which my invention is capable of use.

Example 1

One successful operation is as follows:
Valencia oranges are burred and the peel ground to a coarse pulp, as by passing the peel through a grinder with a face-plate having about three-sixteenth inch holes. The batch consists of parts by weight as follows:

| | Parts |
|---|---|
| Ground peel | 1,300 |
| Water | 1,900 |
| 20° Bé. HCl | 7 |
| KCl | 0.325 |

The batch is heated to 90° C. and held at that temperature for ten minutes. Then 11.6 parts 20° Bé. HCl are added and the mass held at about 90° C. for forty-five minutes. The batch is then cooled to about 40° C. and inoculated with yeast, which has been cultured in orange juice. The inoculated mass is stored at 37° C. until fermentation has progressed to the optimum point. The optimum is determined by tests of the viscosity of successively withdrawn samples of pectin solution. When the viscosity has been reduced to the desired point, the fermentation is halted, and the mass heated and pressed to recover the pectin liquor. The pectin is precipitated with alcohol and dried, and subsequently tested for ash and jelly grade. The grade in a typical operation in accordance with these detailed directions was 175 and ash content 3.2%.

Example 2

The following description of another operation will give an indication of variations in practice.

To one thousand pounds of wet, finely divided orange peel is added sufficient HCl to adjust the hydrogen ion activity to about pH 3.6 in order to prevent demethoxylation of pectin during the heating step. The pulp is then heated quickly to 100° C. as by being passed through a device in the nature of an oil still heated by steam. From the still, the pulp is conveyed to a tank where the hydrogen ion content of the pulp is adjusted to about pH 2.9. The pulp is maintained at this pH and between 80° C. and 85° C. for forty-five minutes to convert protopectin to pectin and to dissolve the pectin into the aqueous phase.

The pulp is next vacuum cooled to approximately 35° C. and inoculated with a yeast of the genus Saccharomyces. A small amount of KCl is generally used as a nutrient for the yeast. The inoculated pulp is then allowed to remain at between 33° C. and 35° C. for a period of four to six days for fermentation of carbohydrate materials.

The fermented pulp is again heated, this time to a temperature of about 88° C., pressed in a batch type hydraulic press to recover the pectin liquor, and the liquor filtered. The filtered liquor is concentrated in a vacuum pan and the pectin precipitated from the concentrated liquor by means of alcohol. The pectin is pressed, washed, and dried, as usual.

In considering further the alternative details of my process, as well as the broader aspects thereof, the following may be pointed out with respect to the various steps of the process as identified by the numerals appearing on the flow sheet:

1. While in the specific examples set forth above oranges have been taken as the source material, other citrus fruits as, for example, grapefruit, and lemons may be used satisfactorily. Various other fruits and vegetables which contain appreciable amounts of pectous substances may be used, as, for example, apples. Sugar, beets, carrots, and the like are also frequently referred to as sources of pectin.

It has been indicated that the source material is to be ground or shredded or otherwise comminuted. This reduction in the particle size of the pectous source material should be carried to the point where the individual particles may be reasonably quickly heated and cooled throughout their entirety. Peel particles which have been ground in a grinder having a face-plate containing holes with a diameter of from one-eighth to three-sixteenth of an inch will be satisfactory for my purposes. Too coarse peel particles should not be used, otherwise thorough heating in the subsequent steps will not be obtained. Peel which has been shredded as by being passed through a machine which cuts it into strips about one-eighth inch thick is very satisfactory for use in my process.

2. The amount of water used for suspending the pectous source material is not critical. Enough water should be used, depending upon the condition of the pulp, to give a handleable suspension and one in which the yeast will have ready access to the pulp particles. Obviously the pulp suspension should be fluid enough to permit thorough stirring. The use of hot water will reduce the amount of heating required subsequently to reach the desired temperatures.

3. The acid may be added to the water in step 2. This modification is advantageous in that it permits thorough intermixing of the acid in the aqueous phase of the system.

While hydrochloric acid has been indicated in the specific examples as being suitable, other acids may be used as for example, sulfuric, nitric, as well as organic acids like citric or tartaric. If the pH of the source material is below the desired range it may be adjusted to within the range by use of suitable alkaline materials as sodium hydroxide or sodium carbonate, etc.

4. This step is directed to the solubilization of the pectous components and, as indicated on the flow sheet, may be carried out at a temperature of about 85° C. and at a pH of 2.9 for forty-five minutes although longer or shorter times may be desirable depending upon the temperature and pH of operation and also upon the kind and condition of the source material. Also this step may, if desired, be combined with the preliminary heating step, indicated at 3, since the pH for converting the protopectin and dissolving the pectin will ordinarily lie within the range of 2.5 to 3.1, and this in turn lies within the range of pH 2.5 to 3.6 suitable for the inactivation of enzymes. It becomes obvious, therefore, that under some operating conditions, steps 3 and 4 will merge into one. That is to say, the pH and temperature of the suspension will be adjusted to the proper range for obtaining pectin and during the course of the conversion of the protopectin to pectin the enzymes will be inactivated.

5. The cooling of the pulp mass may be accomplished in any suitable manner. It is desirable that the mass be thoroughly cooled to within the range of from 30° C. to 40° C. prior to inoculation with the yeast. Under normal operating conditions and when suitable equipment is available I prefer to cool the pulp to at least about 33° C. and preferably around 30° C. in order to prevent subsequent excessive breakdown of the pectin molecule by heat.

6. Where I have referred to the use of yeast for inoculation it is, of course, obvious that many yeasts are capable of fermenting sugars and other materials which are associated with the pectous material in the various fruits and vegetables. That yeast is best which ferments the most of such unwanted elements and which will operate under wide conditions of temperature, hydrogen ion, etc. A yeast is desirable which works rapidly and gives contaminating microorganisms little chance to interfere. I have used many yeasts with successful, if variable, results. Mixtures of different yeasts may be used. My invention is not dependent upon or limited to any particular agent for obtaining the desired reduction of extraneous impurities of the pectin solution but its gist is the performance of this step immediately upon obtaining the pectin in solution. Whatever agent is used, clearly it must not substantially adversely affect the pectin. This is not to say that, for example, no grade loss can be tolerated, since a reasonable grade loss may be more than countered by gains in other respects such as increased yield of available pectin, reduced costs of filtration and concentration, etc.

While I have mentioned hereinbefore that suitable yeasts may be cultured for my process by means of orange juice, it is obvious that the culturing medium for the yeast may be any of the known media used for culturing yeast of the genus Saccharomyces. Furthermore, a portion of the fruit or vegetable source material which is being used for the extraction of pectin may itself serve as a very satisfactory medium for culturing the yeast to be used.

7. The time of fermentation is variable within very wide limits. The time, pH, and temperature of fermentation will differ with different ferments. Pectinous source materials vary so very widely that it is impracticable to set out exact conditions, but establishment of proper conditions will fall within the skill of those working in this art. Fermentation of the carbohydrate substances will necessarily not be allowed to go to completion but will be continued until the soluble solids content or the viscosity of the pectin extract is at a point satisfactory to the operator. The progress of the fermentation may be determined somewhat by making periodical determinations of the percentage soluble solids in the aqueous phase. That is to say, the percentage of soluble solids of the pectous material prior to inoculation may be determined by means of a suitable refractometer and then after the mass is inoculated and fermentation has started, periodic determinations of the refractive index of the aqueous phase may be made. By this scheme it may be determined when, by reason of the yeast fermentation, the percent of soluble solids has decreased to a satisfactory point so that the fermentation may be stopped by heating the mass or by other means.

The subsequent steps, 8 to 11 inclusive, are all steps which are well known to those skilled in the preparation and manufacture of pectin and the many modifications which may be used in these steps are all applicable in my process.

A number of advantages inhere in my process. In the ordinary process, the pressing of the treated pulp for recovery of the pectin liquor is attended by great difficulty due to the nature of the solid material and the liquor. Further, the viscosity of the pectin liquor is very high for a given content of pectin, due to a large accompaniment of other solids, including sugars and gums which are dissolved along with the pectin. These materials ordinarily remain with the pectin from the time of treatment of the pulp with acid until the pectin is precipitated from solution, and may even contaminate the precipitate. This high viscosity also causes difficulty in filtering the pectin liquor, and is a limiting factor in the vacuum concentration of the liquor.

By changing the unwanted soluble solids materials to liquids and/or gases, such as alcohols and carbon dioxide, I am able to reduce the viscosity of the pectin liquor and thus to render the process cheaper and easier to carry out than has been true in the past. Progress of the fermentation step can be watched by determination of total remaining soluble solids or by measurement of the viscosity of the solution. I have found this latter method convenient for routine determinations. I have been able to reduce the soluble solids content of the pectin liquor as much as 40% with an accompanying decrease in viscosity. Obviously this allows an equivalent increase in concentration of the pectin liquor by evaporation. That is, the liquor can be concentrated to the same solids content as was previously practiced, but the solids now will be substantially wholly pectin, thus the volume reduction of a given amount of liquor can be greater. The higher concentration in turn allows the use of smaller quantities of precipitating reagents such as alcohol.

Since the liquor is less viscous as obtained, it is easier to press from the pulp, and easier to filter prior to concentration. This feature may be taken advantage of in another way, that is, by using less water in the acid treatment, thus obtaining a more highly concentrated press liquor.

It can be seen that many practical economies in operation result from the practice of my invention. Probably the greatest total number of advantages are realized when the pectin is precipitated by the use of alcohol, since in the method involving the use of aluminum salts, the pectin solution is ordinarily not concentrated.

This application is a continuation-in-part of my co-pending application Serial No. 392,669, filed May 9, 1941.

Having thus described my invention in such full, clear, and concise language as to enable others skilled in the art to use the same, I claim as my invention and desire to secure by Letters Patent the following:

1. A process for the preparation of pectin from pectous source material comprising converting pectous components of said source material into water-soluble pectin to form an aqueous slurry containing the residual source material and the water-soluble pectin and prior to the separation thereof growing yeast in said aqueous slurry, thereby breaking down non-pectous carbohydrate substances contained in said slurry, and thereafter separating a liquor containing water-soluble pectin from the slurry.

2. A process for the preparation of pectin from pectous source material comprising acidifying the material, and heating the same for a time sufficient to convert pectous components of said source material into water-soluble pectin, cooling the aqueous slurry resulting from said treatment and prior to the separation thereof growing yeast in said aqueous slurry, thereby breaking down the non-pectous carbohydrate substances therein contained, and thereafter separating a liquor containing water-soluble pectin from the slurry.

3. A process for the preparation of pectin from pectous source material comprising adjusting the pH of the material to within a range of 2.5 to 3.6, heating the material to a temperature of about 90° C. for a time sufficient to convert pectous components of said source material into water-soluble pectin, cooling the slurry resulting from said treatment to about 40° C. and prior to the separation thereof growing yeast in said slurry thereby breaking down the non-pectous carbohydrate substances in said slurry, and thereafter separating a liquor containing water-soluble pectin from the slurry.

4. A process for the preparation of pectin from citrus peel comprising adjusting the pH of the peel to within a range of 2.5 to 3.6 by means of hydrochloric acid, heating the peel to a temperature of about 90° C. for a time sufficient to convert pectous components of said peel into water-soluble pectin, cooling the slurry resulting from said treatment to about 40° C. and prior to the separation thereof growing yeast in said slurry thereby breaking down the non-pectous carbohydrate substances in said slurry and thereafter separating liquor containing water-soluble pectin from the slurry.

5. A process for the preparation of pectin from pectous source material comprising adjusting the pH of the material to about 3.6, quickly heating the material to a temperature of about 100° C., adjusting the pH to about 2.9, maintaining the material at a temperature of between 80° C. and 85° C. for a time sufficient to convert pectous components of said source material into water-soluble pectin, cooling the slurry resulting from said treatment to about 40° C. and prior to the separation thereof growing yeast in said slurry thereby breaking down the non-pectous carbohydrate substances in said slurry, and thereafter separating a liquor containing water-soluble pectin from the slurry.

6. A process for the preparation of pectin from pectous source material comprising adjusting the pH of the material to within a range of 2.5 to 3.6, heating the material to a temperature of about 90° C. for a time sufficient to convert pectous components of said source material into water-soluble pectin, cooling the slurry resulting from said treatment to between about 30° C. and 40° C. and prior to the separation thereof growing yeast in said slurry thereby breaking down the non-pectous carbohydrate substances in said slurry, and thereafter separating a liquor containing water-soluble pectin from the slurry.

HERBERT S. BAILEY.